United States Patent [19]
Jung

[11] Patent Number: 6,003,799
[45] Date of Patent: Dec. 21, 1999

[54] BACKSTOP DEVICE FOR PREVENTING REVERSE ROTATION OF ROTOR IN FISHING REELS

[75] Inventor: Dae-In Jung, Busan-si, Rep. of Korea

[73] Assignee: Kum Yang Leport Co., Ltd., Busan-Si, Rep. of Korea

[21] Appl. No.: 09/089,159

[22] Filed: Jun. 2, 1998

[30] Foreign Application Priority Data

Jul. 9, 1997 [KR] Rep. of Korea ............ 97-18691

[51] Int. Cl.$^6$ ................................. A01K 89/02
[52] U.S. Cl. ............... 242/299; 242/293; 242/295; 242/301; 192/45
[58] Field of Search ............... 242/299, 257, 242/293, 295, 297, 298, 301; 192/223.2, 45

[56] References Cited

U.S. PATENT DOCUMENTS

| | | | |
|---|---|---|---|
| 3,190,417 | 6/1965 | Bacon | 192/45 |
| 3,972,573 | 8/1976 | Marola | 192/45 X |
| 4,291,846 | 9/1981 | Carpenter. | |
| 5,007,514 | 4/1991 | Hattori et al. | 192/45 |
| 5,156,246 | 10/1992 | Iga et al. | 192/45 |
| 5,379,959 | 1/1995 | Sato. | |
| 5,419,504 | 5/1995 | Miyazaki et al.. | |
| 5,547,055 | 8/1996 | Chang et al. | 192/45 |
| 5,617,937 | 4/1997 | Zettner et al. | 192/45 |
| 5,642,796 | 7/1997 | Tabe | 192/45 X |
| 5,738,292 | 4/1998 | Kang et al. | 242/299 X |
| 5,819,898 | 10/1998 | Stark | 192/45 |
| 5,857,632 | 1/1999 | Arkowski | 242/297 |

OTHER PUBLICATIONS

"Dispositif d'embrayage perfectionne'." Brevet D'Invention. Gr. 5, Cl. 3, No. 1.034.787, pp. 3–41149, Jul. 1953.

"Polyclutch–Model 30." Custom Products Corp., Bulletin 962, Mar. 1965.

*Primary Examiner*—Donald P. Walsh
*Assistant Examiner*—Minh-Chau Pham
*Attorney, Agent, or Firm*—Oblon, Spivak, McClelland, Maier & Neustadt, P.C.

[57] ABSTRACT

A backstop device prevents reverse rotation of a rotor in fishing reels The backstop device including an inner race and a backstop body, which are cooperatively assembled into a single body. The inner race has a plurality of needle rollers individually held in a roller seat opening. The backstop body is fitted over the inner race so as to prevent reverse rotation of the rotor and acts as an outer race of a one-way roller bearing. The roller bearing is free from any expensive or complicated outer race. The backstop device is also free from any gap formed between the bearing receiver of the backstop body and the roller bearing and reduces the production cost of a fishing reel.

1 Claim, 7 Drawing Sheets

BACKSTOP DEVICE FOR PREVENTING REVERSE ROTATION OF ROTOR IN FISHING REELS

BACKGROUND OF THE INVENTION

1. Field of the Invention

The present invention relates, in general, to a back-stop device for preventing reverse rotation of a rotor in fishing reels and, more particularly, to a backstop device comprising an inner race, consisting of a plurality of needle rollers individually kept in a roller seat opening, and a backstop body integrated with the inner race so as to prevent reverse rotation of a rotor and acting as an outer race of a one-way roller bearing, thus being free from any typical expensive and complicated outer race.

2. Description of the Prior Art

As well known to those skilled in the art, typical backstop devices, used for preventing reverse rotation of a rotor in fishing reels, include a one-way roller bearing and a backstop body. The typical backstop device including a one-way roller bearing and a backstop body is shown in FIGS. 1 and 2. The one-way roller bearing 3 of a typical backstop device includes two races: an inner race 1 and an outer race 2 which are assembled into a single body. The inner race 1 includes a cylindrical body 1a with a plurality of regularly spaced roller seat openings 1b. A needle roller 1d is rotatably held in each of the roller seat openings 1b by a roller holder 1e and is biased by a plate spring 1c installed on one side surface of each roller seat opening 1b.

The outer race 2 has to withstand a wedging effect of the needle rollers 1d, so the race 2 is preferably formed of a case hardened steel plate through a drawing process. That is, the outer race 2 is formed as a cylindrical body, closed at the bottom and has outward bulges at regularly spaced axial positions of the side wall, thus having a plurality of axially bulging portions 2a. Due to the axially bulging portions 2a, interior depressions 2b and sloped surfaces 2c are formed on the inner surface 2e of the outer race 2. The inner surface 2e of the outer race 2 is produced by a nitrification or corrosion-resistive process so as to improve anticorrosion properties. The inner lip of the outer race 2 extends slightly inward, thereby forming an annular collar 2d capable of preventing an unexpected separation of the inner race 1 from the outer race 2.

The backstop body 4 of a typical backstop device includes a cylindrical bearing receiver 4a which receives and holds the one-way roller bearing 3. The inner surface of the bearing receiver 4a is provided with a plurality of regularly spaced axially formed ridges 4c with a plurality of valleys 4b being formed between the ridges 4c, thus contacting the axially bulging outer surface of the outer race 2. A toothed ring 4e, with a plurality of stop grooves 4d, is exteriorly formed on one end of the bearing receiver 4a. In the above backstop device, the one-way roller bearing 3 and the backstop body 4 are separately produced prior to being assembled into a single body. The construction of an assembled backstop device is shown in a cross-sectioned view of FIG. 2 in detail.

In order to assemble the one-way roller bearing 3 and the backstop body 4 into a backstop device, the roller bearing 3 is fitted into the bearing receiver 4a of the backstop body 4 prior to being installed in a fishing reel.

FIGS. 3 and 4 are views showing the construction and operation of the typical backstop device installed in a fishing reel. As shown in the drawings, when a handle (not shown) of the reel is rotated with a predetermined direction by a user, the rotating force of the handle is transmitted to a helical gear 15 of a hollow drive shaft 10 through a drive gear 14, thus rotating the drive shaft 10 along with a sleeve 11.

When a control lever 13 is operated so as to bring a stopper 12 into engagement with one of the stop grooves 4d of the backstop body 4, the backstop body 4 is brought into a stop position where the body 4 is not rotatable. When the drive shaft 10 along with the sleeve 11 is rotated in a normal direction (clockwise in FIG. 3) at such a stop position of the backstop body 4, the needle rollers 1d interposed between the sloped surfaces 2c of the outer race 2 and the external surface of the sleeve 11, roll on the sleeve 11 in the normal direction. In such a case, each of the axially bulging portions 2a of the outer race 2 moves to one side of an associated valley 4b of the backstop body 4. Therefore, each of the needle rollers 1d shifts from the shallow portion of the sloped surface 2c to the interior depression 2b due to the frictional rotating force of the sleeve 11 being rotated toward the interior depressions 2b. The needle rollers 1d are thus positioned and smoothly rotated in the depressions 2b, thus allowing the rotor 16, mounted to the end of the drive shaft 10, to be freely rotated in the normal direction.

Meanwhile, when the drive shaft 10 along with the sleeve 11 is rotated in a reverse direction (clockwise in FIG. 3) at the stop position of the backstop body 4, the needle rollers 1d roll on the sleeve 11 in the reverse direction. In such a case, each of the axially bulging portions 2a of the outer race 2 moves to the other side of an associated valley 4b of the backstop body 4. Therefore, each of the needle rollers 1d shifts from the deep portion of the slopes surface 2c to the shallower portion thereof due to the frictional rotating force of the sleeve 11 being rotated toward the shallow portions of the slope surfaces 2c. The needle rollers 1d are thus wedged between the shallow portions of the sloped surfaces 2c and the outer surface of the sleeve 11, so both the backstop body 4 and the sleeve 11 are not rotatable. Therefore, the sleeve 11, the drive shaft 10, and the rotor 16 are all prevented from being rotated in the reverse direction.

However, the above backstop device has a problem caused by the one-way roller bearing and the backstop body which are separately produced prior to being assembled into a single body. That is, the roller bearing is fitted into the bearing receiver and integrated with the backstop body, prior to being installed in a fishing reel. Therefore, a gap is formed between the bearing receiver of the backstop body and the outer race of the roller bearing, resulting in an idling rotation of the roller bearing when the sleeve is rotated in the normal or reverse direction. Due to the idling rotation of the roller bearing, operation of the reel during jerking motion of a fishing rod is somewhat delayed. Since the roller bearing is fitted into the backstop body prior to being installed in a fishing reel, the typical backstop device cause problems while assembling the fishing reel. Furthermore, the configuration of the outer race of the roller bearing is complicated, so it is very difficult to design such an outer race. Another problem experienced in the typical backstop device is that both the one-way roller bearing and the backstop body are expensive and have to be separately managed by a reel manufacturer, thus increasing the production cost of a fishing reel.

SUMMARY OF THE INVENTION

Accordingly, the present invention has been made keeping in mind the above problems occurring in the prior art. An object of the present invention is to provide a backstop device, which comprises an inner race, consisting of a plurality of needle rollers individually kept in a roller seat opening with a biasing means being provided on one side surface of the opening, and a backstop body used for preventing reverse rotation of a rotor and simultaneously acting as an outer race of a one-way roller bearing, thus the backstop device of the present invention is free from any typical expensive or complicated outer race.

In order to accomplish the above object, there is provided a backstop device for preventing reverse rotation of a rotor in fishing reels of the present invention, comprising: an inner race of a bearing and a backstop body fitted over the inner race. The inner race consists of: a cylindrical body provided with a plurality of regularly spaced roller seat openings; biasing means installed on one side surface of each of the roller seat openings, the biasing means V-shaped configuration; a protrusion provided on the external surface of the cylindrical body adjacent an upper corner of each of the roller seat openings; and a needle roller rotatably held in each of the roller seat openings and biased by the biasing means. The backstop body, fitted over the inner race, comprises: a cylindrical bearing receiver receiving and holding the inner race and acting as an outer race of the bearing, the bearing receiver being axially recessed at regularly spaced positions on the inner surface thereof, having a plurality of interior depressions and slope surfaces; and a toothed ring exteriorly formed on the lower end portion of the bearing receiver, the toothed ring being provided with a plurality of stop grooves for being selectively stopped by a stopper.

BRIEF DESCRIPTION OF THE DRAWINGS

The above and other objects, features, and other advantages of the present invention will be more clearly understood from the following detailed description taken in conjunction with the accompanying drawings, in which:

FIGS. 7a and 7b are sectional views showing the operation of the backstop device of this invention installed in a fishing reel, in which:

FIG. 7a shows the operation of the backstop device when a sleeve is rotated in a normal direction; and FIG. 7b shows the operation of the backstop device when the sleeve is rotated in a reverse direction.

DESCRIPTION OF THE PREFERRED EMBODIMENTS

Figure 1:
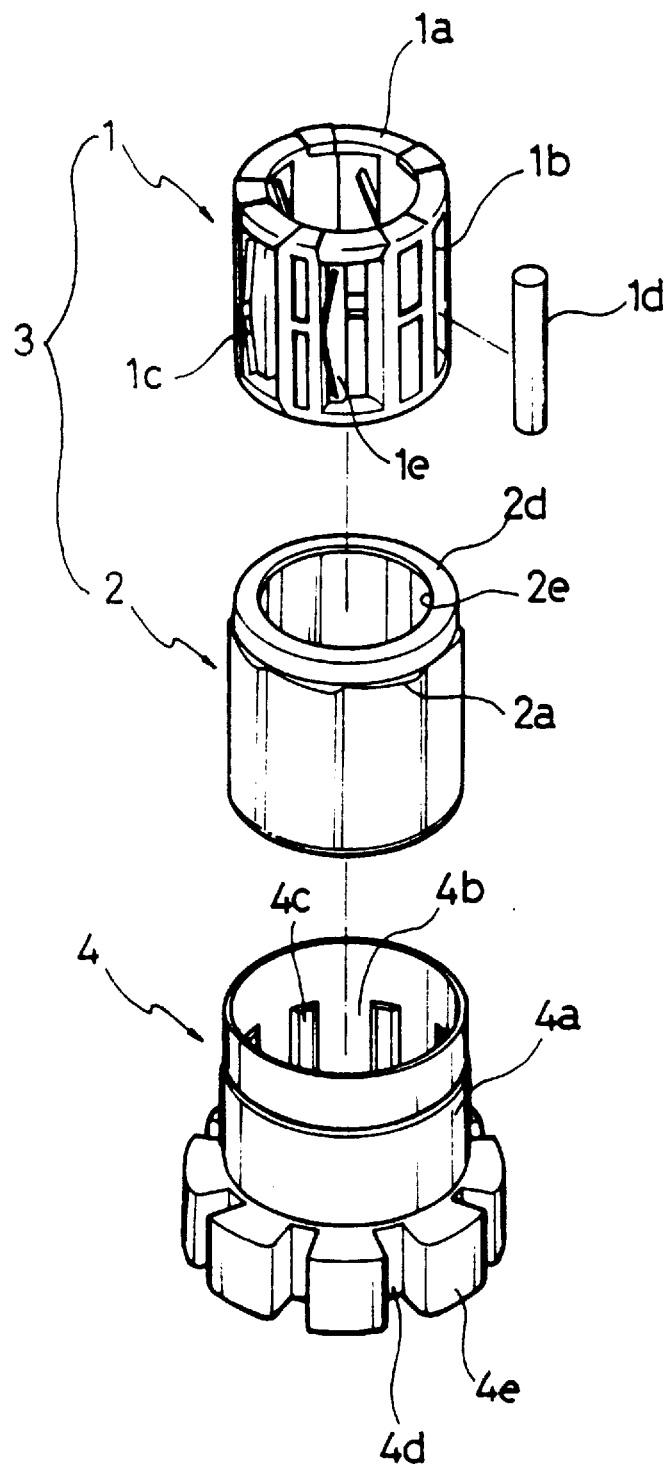
FIG. 1 is an exploded perspective view of a typical backstop device comprising a one-way roller bearing and a backstop body.
Figure 2:
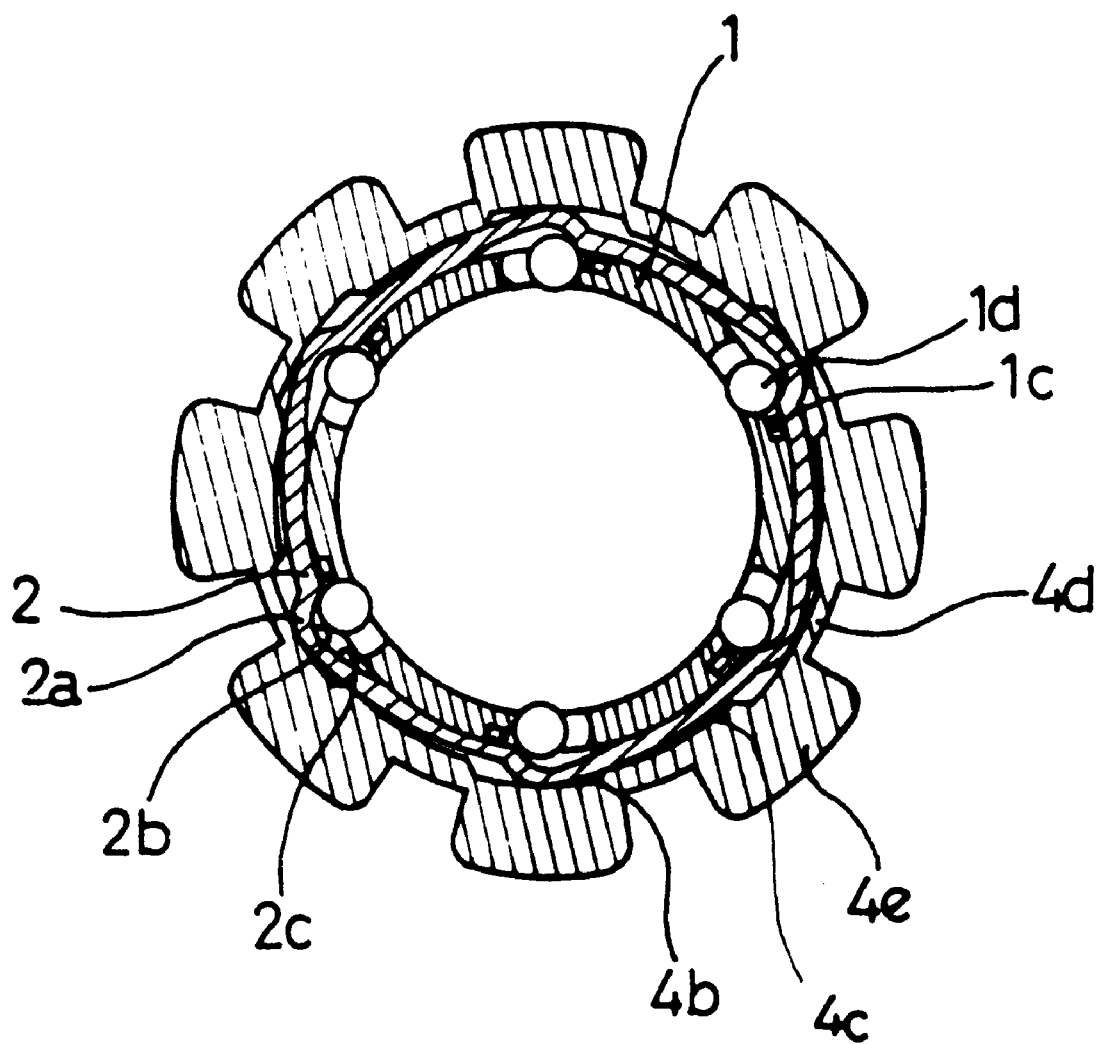
FIG. 2 is a cross-sectional view of the backstop device of FIG. 1, wherein the one-way roller bearing is assembled with the backstop body into a single body.
Figure 3:
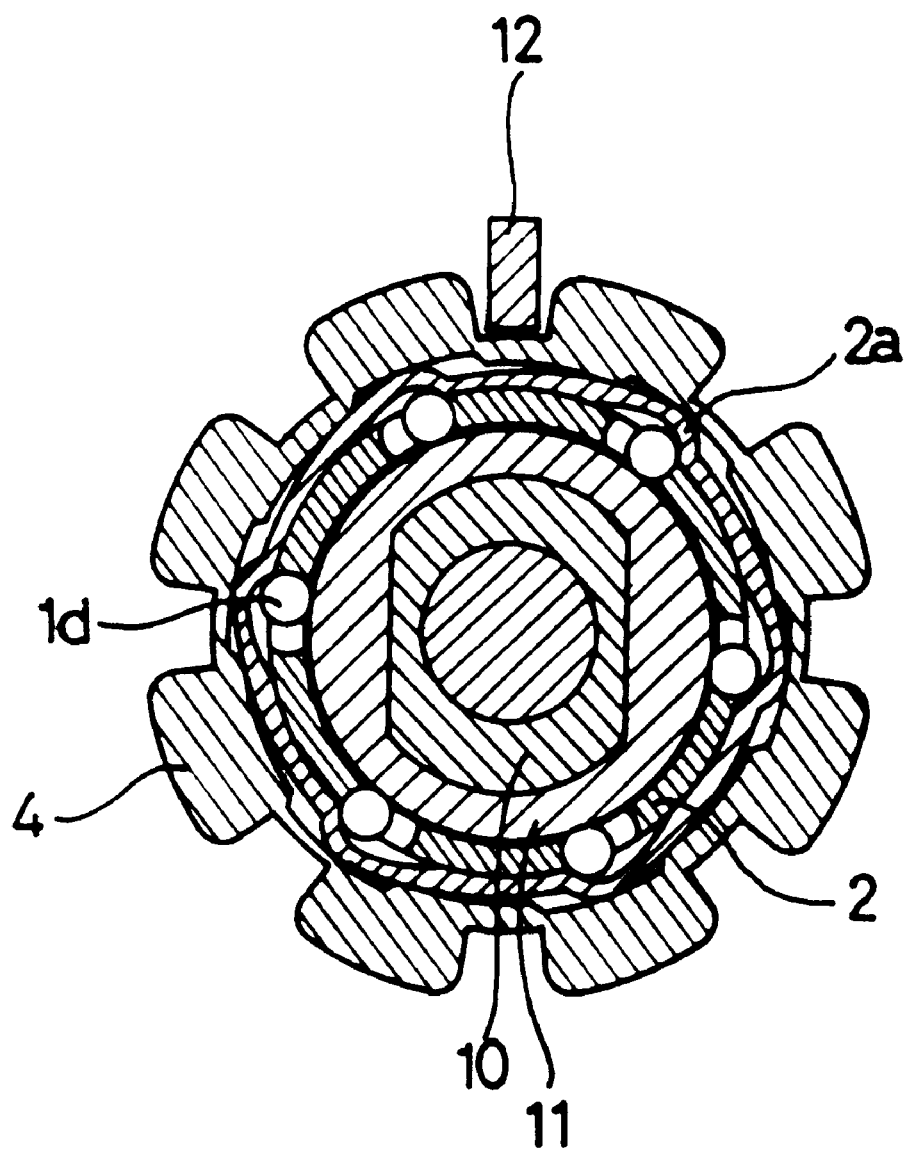
FIG. 3 is a cross-sectional view taken along line A—A of FIG. 4, showing the construction and operation of the typical backstop device installed in a fishing reel.
Figure 4:
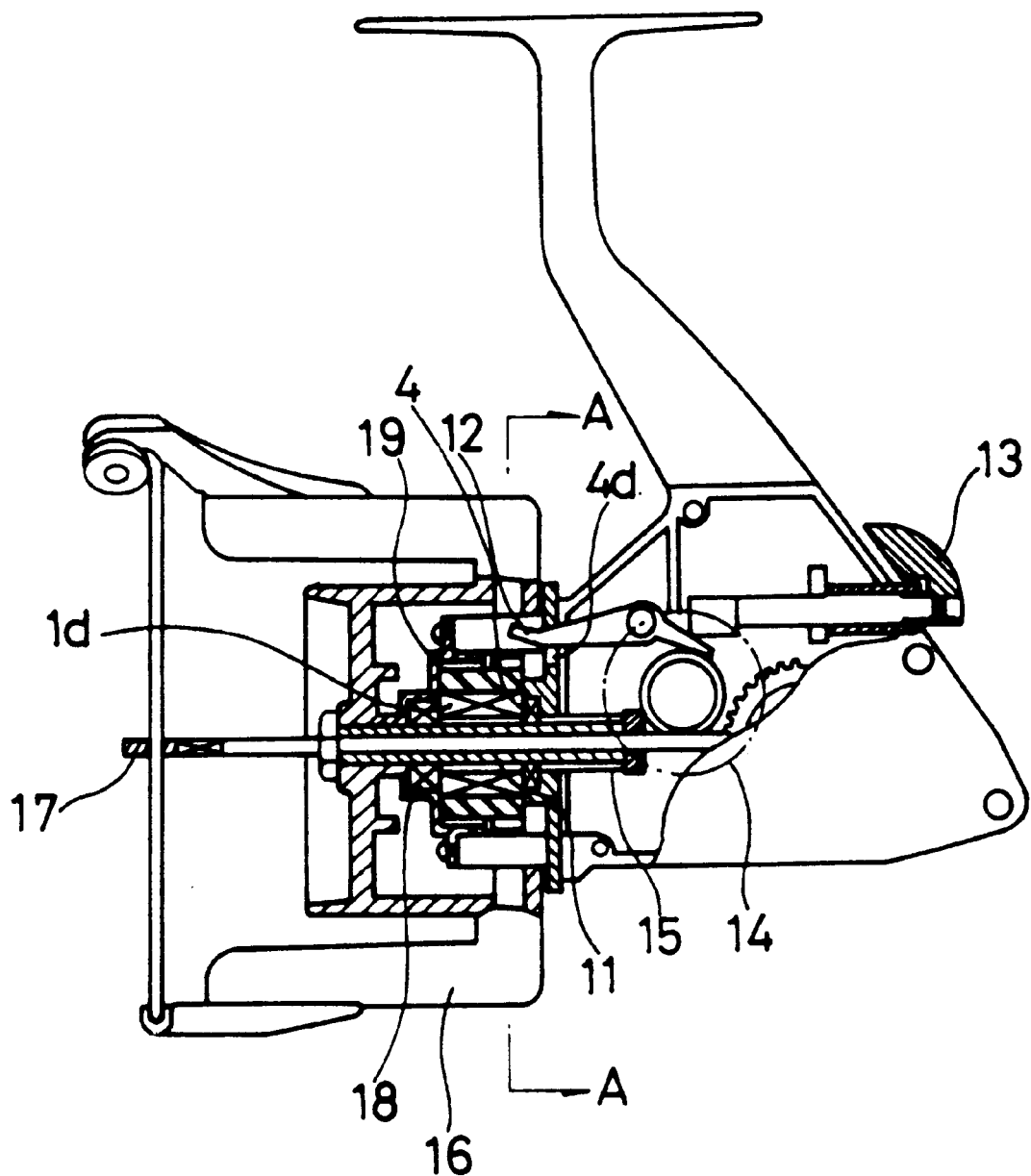
FIG. 4 is a partial sectional view of a typical fishing reel provided with a backstop device.
Figure 5:
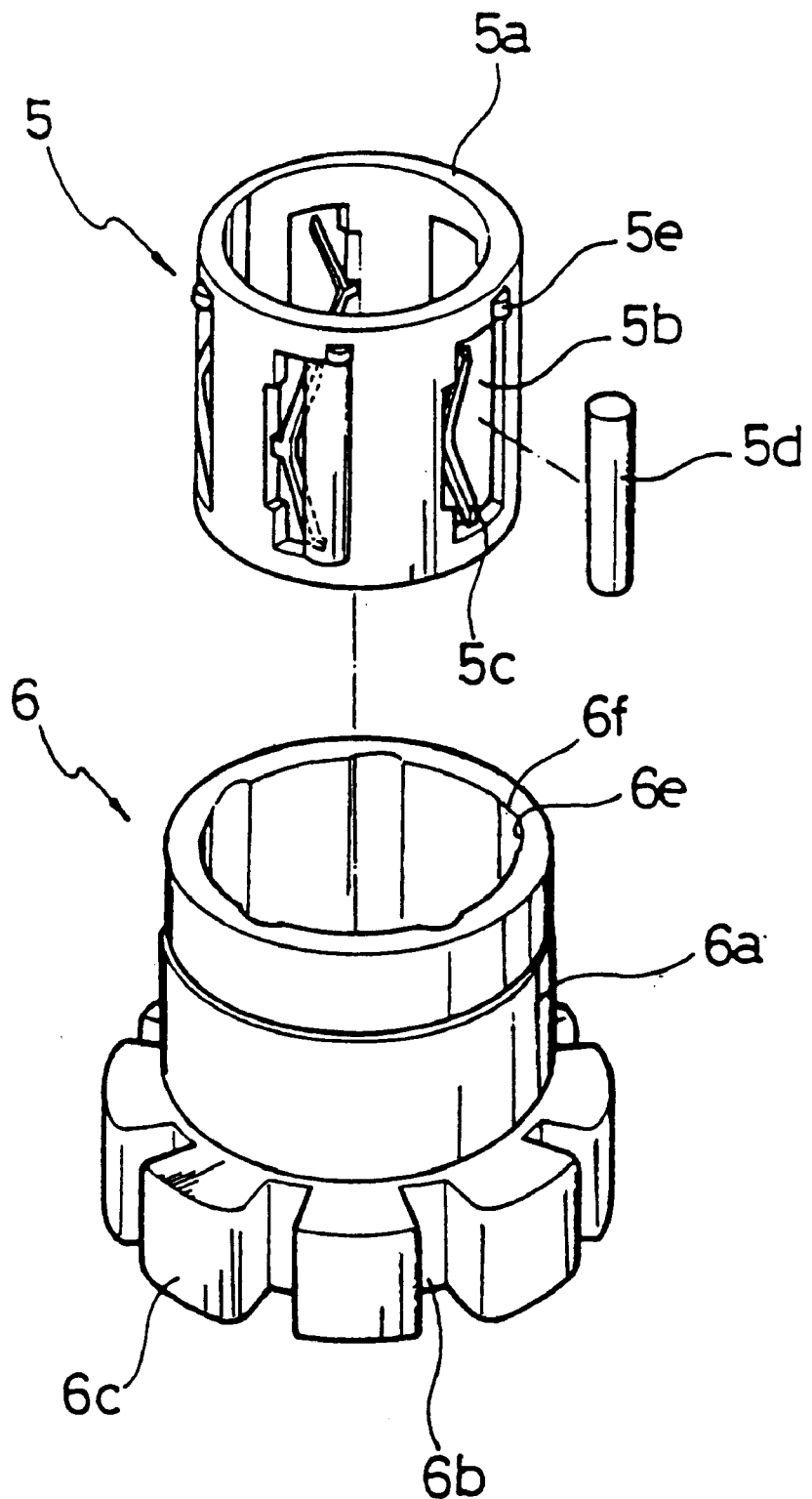
FIG. 5 is an exploded perspective view of a backstop device in accordance with the preferred embodiment of the present invention.
Figure 6:
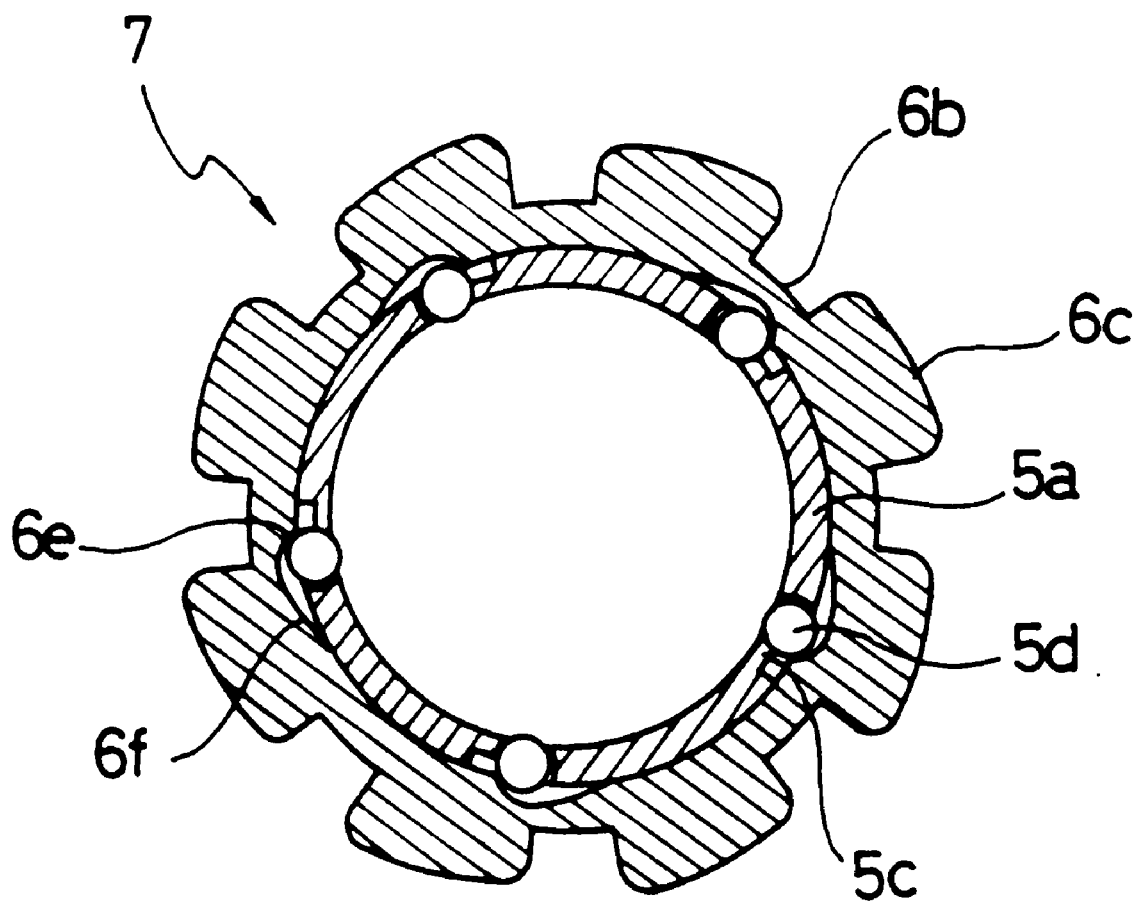
FIG. 6 is a cross-sectional view of the backstop device of FIG. 5, wherein a one-way roller bearing is assembled with a backstop body into a single body.

As shown in the drawings, a rotatable hollow drive shaft 10 is fitted over a spool shaft 17, while a rotor 16 is mounted to one end of the drive shaft 10. A helical gear 15, which is integrated with the other end of the drive shaft 10, engages with a drive gear 14. The above drive gear 14 is rotatable in conjunction with a handle (not shown).

Referring now to FIGS. 5, 6 and 7a & 7b showing the construction and operation of a backstop device according to the present invention, sleeve 11 is fitted into the drive shaft 10, while a backstop device 7 is fitted over the sleeve 11. The backstop device 7 comprises a one-way inner race 5 and a backstop body 6. The backstop body 6 is cooperatively assembled with the inner race 5 into a single body and acts as an outer race, thus forming a one-way roller bearing. A bearing 18 is fitted between each end of the sleeve 11 and a fixed housing 19, thus allowing the rotor 16 to be smoothly rotatable while maintaining concentricity without generating operational noises. Due to the bearings 18, 18a, the backstop device 7, comprising the inner race 5 integrated with the backstop body 6, is smoothly operated and maintains concentricity while being free from any damage even when the device 7 is unexpectedly overloaded or impacted.

A spring-biased stopper 12 is hinged to a support member outside the backstop body 6 in a way such that the stopper 12 selectively engages with one of the stop grooves 6b of the backstop body 6 so as to stop the backstop body 6. A control lever 13 is provided at the rear portion of the reel housing in a way such that the lever 13 selectively rotates the rear end of the stopper 12 at an angle of rotation, thus bringing the front end of the stopper 12 into engagement with one of the stop grooves 6b of the backstop body 6.

The backstop device 7, which allows the rotor 16 to be exclusively rotated in a normal direction, is formed by integrating the inner race 5 and the backstop body 6 into a single body. The inner race 5 comprises a cylindrical body 5a with a plurality of regularly spaced roller seat openings 5b. A needle roller 5d is rotatably held in each of the roller seat openings 5b and is biased by a biasing means 5c installed on one side surface of each roller seat opening 5b. The biasing means 5c is angled at its middle portion, thus having a V-shaped configuration. The cylindrical body 5a has a protrusion 5e formed on the surface adjacent the upper corner of each of the roller seat openings 5b.

Meanwhile, the backstop body 6 comprises a cylindrical bearing receiver 6a which receives and holds the inner race 5 and acts as an outer race of a one-way roller bearing. The inner surface of the bearing receiver 6a is axially recessed at regularly spaced positions, thus having a plurality of cup-shaped depressions 6e and sloped surfaces 6f. A toothed ring 6c, with a plurality of stop grooves 6b, is exteriorly formed on the lower end of the bearing receiver 6a.

The operational effect of the above backstop device will be described hereinbelow.

When the handle (not shown) of the reel is rotated by a user, the rotating force of the handle is transmitted to the helical gear 15 of the drive shaft 10 through the drive gear 14, thus rotating the drive shaft 10 along with the sleeve 11.

When the control lever 13 is not operated, the stopper 12 engages with none of the stop grooves 6b of the backstop body 6, thus allowing the backstop body 6 to be freely rotatable in a fishline winding or unwinding direction. In such a case, the drive shaft 10 and the sleeve 11, both being fitted into the backstop body 6, are freely rotatable, so the rotor 16, mounted to the end of the drive shaft 10, is freely rotatable in the fishline winding direction (normal direction, or the fishline unwinding direction (reverse direction).

That is, when the stopper 12 does not engage with any of the stop grooves 6b of the backstop body 6, the backstop body 6 is free from external forces. When the drive shaft 10 at the above state is rotated in the normal or reverse direction, the needle rollers 5d, biased by the biasing means 5c of the inner race 5, may be moved from the deep portions of the sloped surfaces 6f to the shallower portions thereof, thus being wedged between the shallow portions of the sloped surfaces 6f and the external surface of the sleeve 11. However, in such a case, the backstop body 6, acting as the outer race of a bearing, is freely rotatable, so the backstop body 6 is rotatable in either direction along with the drive shaft 10.

When the control lever 13 is operated so as to bring the stopper 12 into engagement with one of the stop grooves 6b of the backstop body 6, the backstop body 6 is brought into a stop position where the body 6 is not rotatable.

When it is necessary to rotate the rotor 16 in a normal direction at such a stop position of the backstop body 6, the inner race 5, cooperatively assembled with the backstop body 6, is rotated in the normal direction along with the sleeve 11. In such a case, the backstop device of this invention is operated as shown in FIG. 7a.

Figure 7A:
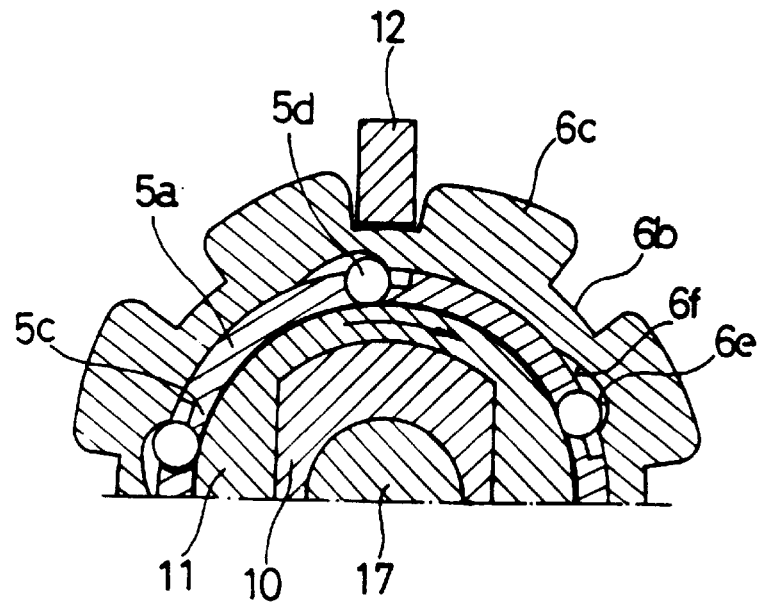

That is, when the drive shaft 10 is rotated in the normal direction with the control lever 13 being operated so as to bring the stopper 12 into engagement with one of the stop grooves 6b of the backstop body 6, the backstop body 6 is brought into a stop position and the sleeve 11 is rotated in the normal direction (clockwise if FIG. 7a). In such a case, the needle rollers 5d, which have been wedged between the shallow portions of the sloped surfaces 6f and the outer surface of the sleeve 11, shift in the normal direction i.e. from the shallow portions of the sloped surfaces 6f to the cup-shaped depressions 6e of the backstop body 6, due to the frictional rotating force of the sleeve 11. The needle rollers 5d are thus positioned and smoothly rotated in the cup-shaped depressions 6e, so the needle rollers 5d along with the sleeve 11 are freely and smoothly rotatable, thereby allowing the rotor 16, mounted to the end of the drive shaft 10, to be freely rotatable in the normal direction.

Figure 7B:
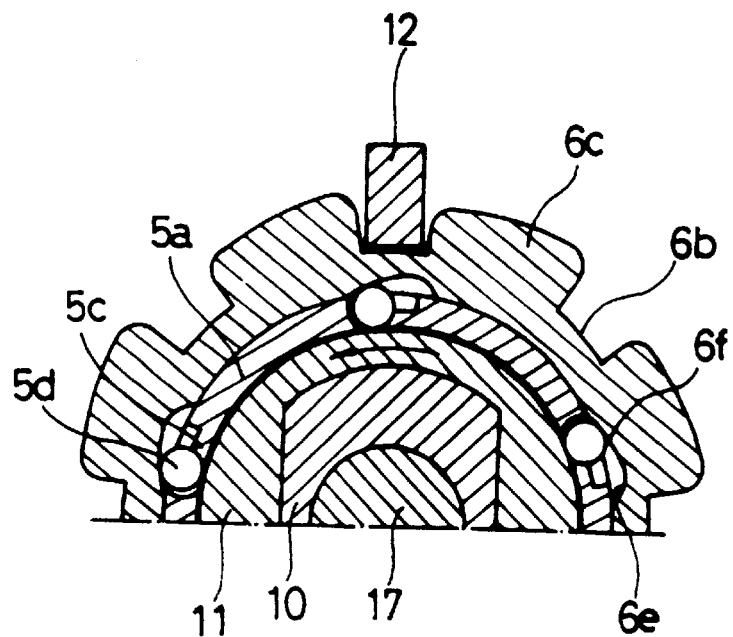

However, when the inner race 5 is rotated in a reverse direction along with the sleeve 11 by rotating the drive shaft 10 in the reverse direction at such a stop position of the backstop body 6, the backstop device of this invention is operated as shown in FIG. 7b.

That is, when the drive shaft 10 is rotated in the reverse direction with the control lever 13 being operated so as to bring the stopper 12 into engagement with one of the stop grooves 6b of the backstop body 6 which brings the backstop body 6 into a stop position, the sleeve 11 is rotated in the reverse direction (counterclockwise in FIG. 7b). In such a case, the needle rollers 5d, which are biased by the biasing means 5c in the roller seat openings 5b, shift in the reverse direction i.e. from the cup-shaped depressions 6e to the shallow portions of the sloped surfaces 6f. The needle rollers 5d are thus wedged between the shallow portions of the sloped surfaces 6f and the outer surface of the sleeve 11, so both the backstop body 6 and the sleeve 11 are not rotatable. Therefore, the sleeve 11, the drive shaft 10, and the rotor 16 are all prevented from being rotated in the reverse direction.

During the above operation, the traveling distance of both the drive shaft 10 and the sleeve 11 is a very short distance, which is determined by the length of each sloped surface 6f formed on the inner surface 6d of the backstop body 6.

When it is necessary to allow the rotor 16 at the above stop position to be rotatable in the reverse direction, the control lever 13 is operated so as to remove the stopper 12 from the stop grooves 6b of the backstop body 6. In such a case, the sleeve 11, the drive shaft 10 and the rotor 16 are all allowed to be rotatable in the reverse direction.

As described above, the present invention provides a backstop device, which is used for preventing reverse rotation of a rotor in fishing reels and comprises an inner race cooperatively assembled with a backstop body into a one-way roller bearing. The inner race consists of a plurality of needle rollers, individually held in a roller seat opening with a biasing means being provided on one side surface of the roller seat opening. The backstop body is used for preventing reverse rotation of the rotor and acts as an outer race of the one-way roller bearing. In the backstop device, the one-way roller bearing is free from any typical expensive or complicated outer race, thus reducing the production cost of the fishing reel. The backstop device is also free from any gap formed between the bearing receiver of the backstop body and the roller bearing, so the device does not result in an idling rotation of the roller bearing when a sleeve is rotated in the normal or reverse direction. Therefore, the backstop device of this invention prevents the operational retardation of a fishing rod jerking motion due to such an idling rotation of the roller bearing. Since the backstop device of this invention is formed by cooperatively assembling (integrating) the inner race with the backstop body into a single structure, the backstop device improves manufacturing efficiency while assembling the fishing reel. Another advantage of the backstop device of this invention is that the device effectively reduces the production cost of a fishing reel.

Although the preferred embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. A backstop device for preventing the reverse rotation of a rotor in fishing reels, comprising:

an inner race of a bearing, said inner race comprising:

a cylindrical body provided with a plurality of regularly spaced roller seat openings and fitted over a sleeve of a fishing reel;

biasing means installed on one side surface of each of said roller seat openings, said biasing means having a V-shaped configuration;

a protrusion provided on an outer surface of said cylindrical body adjacent an upper corner of each of said roller seat openings; and a plurality of needle rollers rotatably held in said roller seat openings and individually biased by said biasing means; and a backstop body fitted over said inner race and comprising:

a cylindrical bearing receiver axially recessed at regularly spaced positions on an inner surface thereof, having a plurality of sloped surfaces extending to cup-shaped depressions of the inner surface, said bearing receiver receiving and holding said inner race and acting as an outer race of the bearing, the needle rollers being movable in either direction on an outer surface of the sleeve between a wedged position on shallow portions of the sloped surfaces and a rotatable position in the cup-shaped depressions in accordance with a rotating direction of the sleeve; and a toothed ring exteriorly formed on a lower end portion of said bearing receiver, said toothed ring being provided with a plurality of stop grooves, said stop grooves being selectively brought into engagement with a stopper so as to stop the backstop body.

* * * * *